No. 843,548. PATENTED FEB. 5, 1907.
A. PELLOW.
INSTRUMENT FOR CENTERING LENSES.
APPLICATION FILED OCT. 4, 1906.
2 SHEETS—SHEET 1.
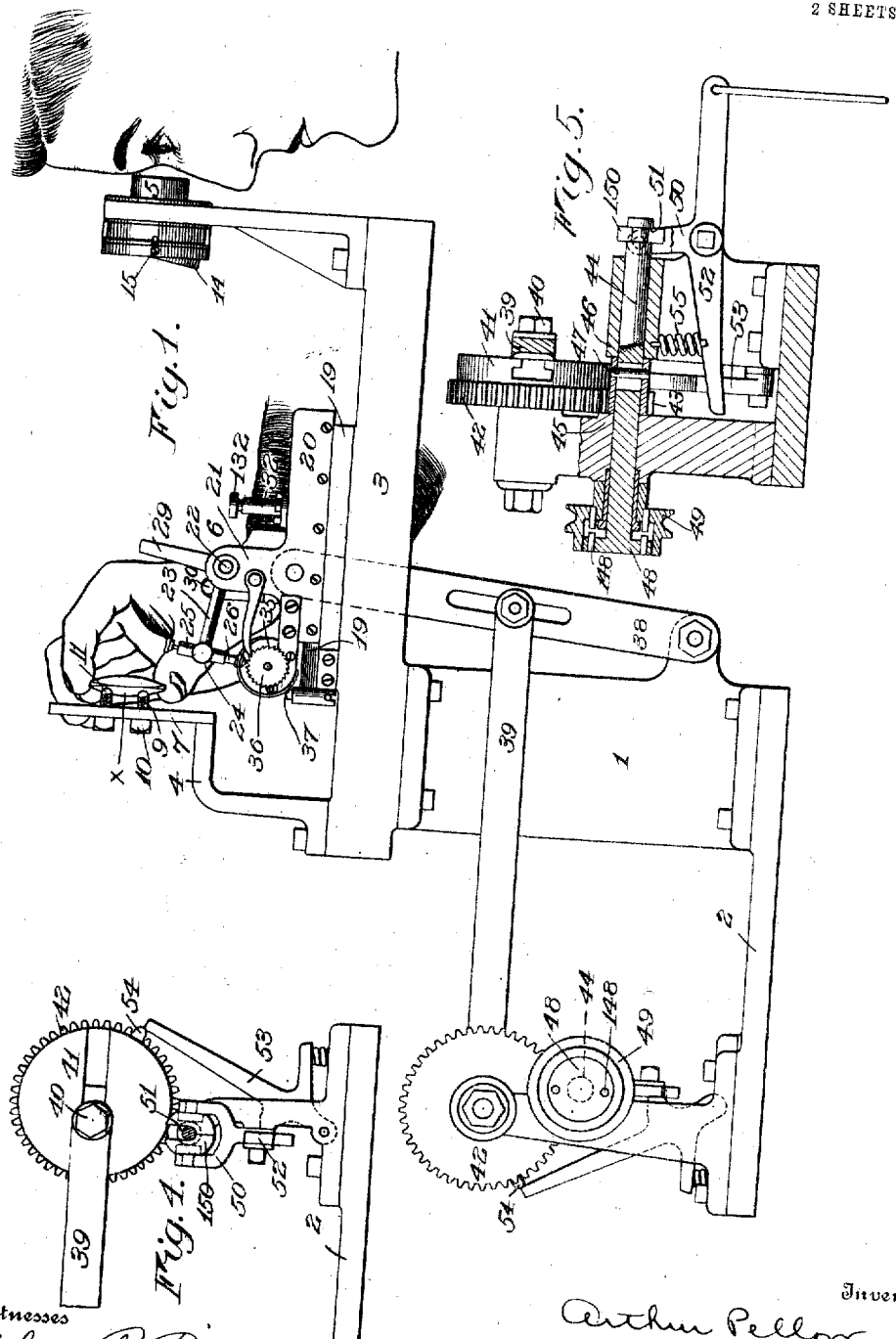
Witnesses
Walter B. Payne
Clarence A. Bateman
Inventor
Arthur Pellow
By Church & Rich
his Attorneys

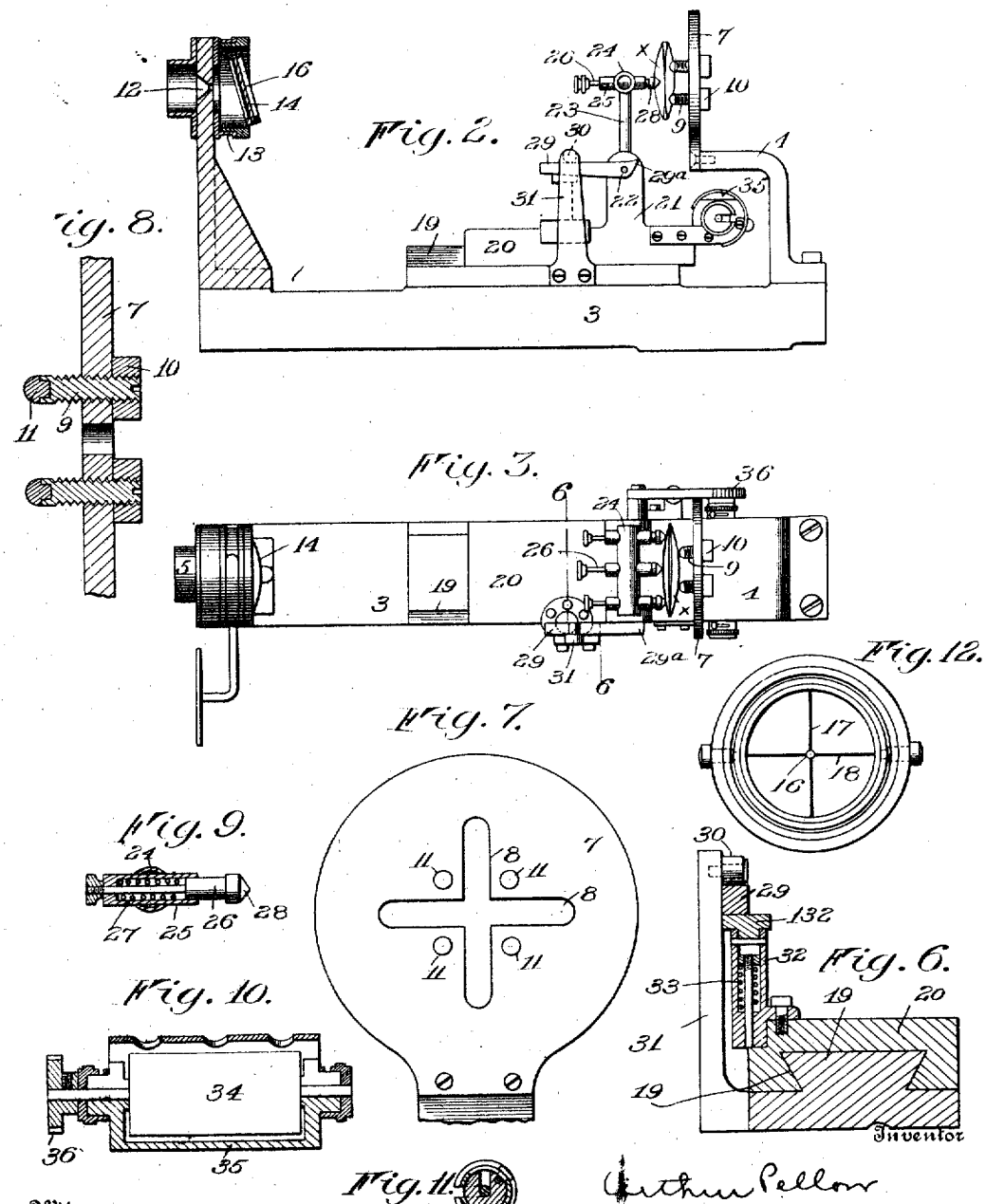

UNITED STATES PATENT OFFICE.

ARTHUR PELLOW, OF ROCHESTER, NEW YORK, ASSIGNOR TO BAUSCH & LOMB OPTICAL COMPANY, OF ROCHESTER, NEW YORK, A CORPORATION OF NEW YORK.

INSTRUMENT FOR CENTERING LENSES.

No. 843,548.      Specification of Letters Patent.      Patented Feb. 5, 1907.

Original application filed April 24, 1905, Serial No. 257,240. Divided and this application filed October 4, 1906. Serial No. 237,384.

*To all whom it may concern:*

Be it known that I, ARTHUR PELLOW, of Rochester, in the county of Monroe and State of New York, have invented certain new and useful Improvements in Instruments for Centering Lenses; and I do hereby declare the following to be a full, clear, and exact description of the same, reference being had to the accompanying drawings, forming a part of this specification, and to the reference-numerals marked thereon.

My present invention relates to improvements in the art of centering lenses with respect to their optical axes, and the purpose of my invention is to provide an instrument for enabling the axes of lenses to be readily determined with extreme accuracy, particularly in lenses of slight curvature, and also to provide a device by the use of which the lenses may be quickly and conveniently manipulated for centering, and while the lens occupies its centered position it may be suitably marked; the present application being a division of my prior application, Serial No. 257,240.

To these and other ends the invention consists in certain improvements and combinations of parts, all as will be hereinafter more fully explained, the novel features being pointed out in the claims at the end of the specification.

In the drawings, Figure 1 is a side elevation of a lens-centering machine adapted for centering lenses in accordance with my invention. Fig. 2 is an elevation of the device looking from the opposite side thereof, the eyepiece and reflector being shown in section. Fig. 3 is a plan view of the device as shown in Fig. 2, the lens being shown in section. Fig. 4 is a view in elevation, showing a device for controlling the clutch mechanism for the marking devices. Fig. 5 is a sectional view showing the clutch mechanism and their operating means for setting the marking devices into operation. Fig. 6 is a sectional view on the line 6 6 of Fig. 3, showing the mechanism for bringing the marking devices into operative position and for positioning the marking devices. Figs. 7 and 8 are views in elevation and section, respectively, of the lens-supporting devices. Figs. 9, 10, and 11 are sectional views of the inking and marking devices, and Fig. 12 is a front view of the object or reflector.

The same numerals of reference in the several figures indicate similar parts.

In order to obtain the best results with lenses, it is essential that they should be mounted with respect to their optical axes, and in finding the optical axis in accordance with my invention the opposite surfaces of the lens are each treated as a separate mirror or reflecting-surface to receive the light-rays from an object, and by manipulating or adjusting the lens while the separate images reflected from the opposite surfaces of the lens are under observation of the operator these images may be brought into coincidence, and when this has been accomplished the lens is centered with respect to its optical axis, and the marking device may be set into operation to mark the center thus obtained, such a method being shown and described fully in my prior application aforesaid.

An instrument particularly adapted for use in centering lenses in accordance with my invention aforesaid is shown in the accompanying drawings as comprising a standard 1, mounted on the base 2 and carrying the horizontal support 3, the latter being of a length suitable to accommodate a lens-support 4 at one end, the eyepiece 5 at the opposite end, and the movable marking device 6 intermediate of the eyepiece and lens-support. This lens-support comprises an upwardly-extending standard carrying a plate 7, arranged perpendicularly of the support 3 and provided with the crossed slots 8 8, through which a dark screen may be sighted from the eyepiece 5 as a background to render the images from the surfaces of the lens clearly visible to the observer. Extending through this plate are a series of supporting-pins each embodying a threaded portion 9, slotted at one end to permit adjustment thereof in a direction transversely of the plate and provided with a lock-nut 10 for securing it in adjusted position, and the forward end of each pin has a head 11, of hard rubber or other suitable material, applied thereto in order to afford a firm support and yet avoid scratching of the lens-surface by engagement therewith. I prefer to employ a series of four pins in rectangular arrangement and projecting equidistantly from the plate, so that their points all lie in the same plane, because lenses having spherical, cylindrical, or plane surfaces may be firmly seated and centered against them.

The eyepiece may be of any suitable form having a small sight-aperture 12, and over this sight-aperture is fitted a casting 13, having a mirror or reflector 14, mounted on the pivots 15, so as to be capable of tilting into different positions to enable the light-rays to be directed upon the lens while it is in position against its support. In this mirror, in alinement with the sight-aperture 12 and the central point of the lens-supporting pins, a clear spot 16 is provided, forming an object which will appear as a black image when reflected and as it is clear enables an observation to be had through it, and consequently the viewpoint of the observer will be from the position of the object. In addition to the object formed by the clear spot of the mirror it is preferable to provide the black cross-lines 17 and 18, extending vertically and horizontally, respectively, of the mirror and intersecting at the clear spot, as this renders the object more readily discernible and enables the axes of cylindrical lenses to be determined, as will presently appear.

Arranged longitudinally of the support 3 and between the eyepiece and lens-support are the ways 19 to receive the reciprocatory carriage 20, the latter having the uprights 21 thereon for supporting the shaft 22, on which a pair of radially-arranged arms 23 are fixed. These arms are connected at their free ends by the bar 24, through which a series of cylinders 25 extend, each cylinder being provided with a plunger 26, having a spring 27 for operating it under a yielding pressure in one direction, and the forward ends of the plungers are provided with the marking devices 28, preferably composed of hard rubber or other suitable material and pointed toward their ends. These plungers carrying the marking devices are so mounted that when they are in operative position their marking devices will be in a line with the horizontal cross-line 18 of the mirror and with an imaginary line extending horizontally through the central point between the lens-supporting pins, the central marking device being directly opposite to the object 16 of the mirror, and the yielding action of the marking devices enables them to accommodate themselves to plane or curved surfaces without moving them out of center.

To the shaft 22 is fixed an operating-lever 29, arranged to coöperate with the roller or projection 30 on the relatively fixed standard 31 as the carriage 20 is moved toward the lens-support to swing the marking devices from the normal position, as shown in Fig 1, to the operative position, as shown in Fig. 2, and as the motion of the carriage is comparatively rapid a cushioning stop or buffer is preferably employed, comprising in the present instance a hollow post 32, fixed on the carriage and provided with a vertically-movable plunger 132, the head of which is formed to engage the under side of the lever when the latter is swung into horizontal position by coöperation with the roller 30, the downward motion of the plunger being cushioned by the spring 33 and limited positively by engagement with the head thereof with the top of the post. This cushioning-stop serves to yieldingly arrest the motion of the operating-lever for the marking devices when it is thrown by the roller 30 and to serve as a rigid support for the lever as the latter is drawn down by the roller 30 as the latter traverses the upper surface of the lever during the advancing movement of the carriage, and this will insure the accurate positioning of the marking devices relatively to the centered lens at each operation of the carriage, a cam or raised portion 29ª being provided on the lever so as to engage the roller 30 during the return motion of the carriage to positively return the marking devices to their normally depressed position.

The inking devices employed in connection with the marking devices comprise in the present instance an inking-roller 34, journaled in a casing 35, fixed to the carriage, and has a ratchet 36 connected thereto and arranged to coöperate with the pawl 37 during the reciprocatory motion of the carriage, causing the inking-roller to present new inking-surfaces to the marking devices prior to each marking operation. The inking-roller is located to receive and support the marking devices when they occupy their normally depressed position, and at this time the marking devices and connected parts will not form an obstruction between the lens and the object and observer.

Any suitable mechanism may be employed for setting the marking devices into operation at the desired moment, the mechanism employed in the present instance embodying a lever 38, pivoted to the standard or base and operatively connected at its free end to the carriage 20, a pitman 39 being connected to this lever and to crank-pin 40, adjustably mounted in the crank-plate 41 to enable the travel of the carriage to be adjusted, the crank-plate being connected to a gear 42, meshing with a pinion 43. This pinion 43 is mounted on the spindle 44 and between the bearings 45 and 46 thereof, a pin 47 being passed through a portion of the pinion and through a longitudinal slot in the spindle to permit relative axial motion of the latter and to transmit rotary motion between the spindle and pinion. One end of the spindle is provided with a head 48, having projections 148 thereon arranged to engage and disengage those of the driving-pulley 49 by a relatively longitudinal motion of the spindle, and the spindle is shifted longitudinally by means of the fork 50, pivotally connected to an operating-collar 150, resting in the groove 51 of the spindle and connected to the pivoted lever 52. This lever is connected at one end to a treadle or other convenient operating mechanism, and the free end of the lever is arranged to coöperate with a pivoted detent 53, which is normally operating under spring-pressure to engage beneath the lever 52, and thereby retain the latter in operated position, a projection 54 being provided on the crank-plate 41 to disengage the detent and the lever 52, permitting the latter to be returned to normal position under action of the spring 55 after the marking device has completed its operation. In the carriage-operating mechanism described continuous rotary motion is imparted to the pulley 45, and when it is desirable to set the marking devices in operation the lever 52 is tilted to shift the spindle 44 longitudinally, causing the coöperatively-arranged projections of the head 48 and the pulley 49 to engage and thereby rotate the spindle, rotary motion of the latter being transmitted to the pinion 43 and in turn to the gear 42 and crank-plate 41, and as the latter rotates the pitman 39 is reciprocated, causing the lever 38 to impart reciprocatory motion to the carriage 20, and during the operation of the carriage the marking devices will be moved into operative position to mark the lens and subsequently returned to a normal position out of alinement with the lens and the mirror, the knocking-off projection 54 of the crank-plate being so placed that the motion of the carriage is interrupted while the marking devices occupy their normal inoperative position.

In operating an instrument of the kind described for performing the method described in my aforesaid prior application the lens $x$, the axis of which is unknown, is held by the hand of the operator firmly against the heads 11 of the lens-supporting pins, and while the lens occupies such a position the mirror 14 is tilted so that an image of the object thereon is plainly visible as reflected from each surface of the lens, a dark screen being arranged behind the lens to render the image more distinct.

The position of the lens $x$ on the supporting-pins may now be shifted by manipulation until these separate images reflected from the anterior and posterior surfaces of the lens appear to coincide, and while the lens is held in such a position the marking devices are brought into action by operation of the lever 52, this causing the carriage 20 to advance toward the centered lens, and in doing so the operating-roller 30 will coöperate with the lever 29 to swing the arms 23, carrying the marking devices, into operative position, and as these marking devices are supplied with ink and operate directly in the line of vision when the lens is centered the central marking device will mark the optical center of the lens, the continued operation of the carriage-operating mechanism causing the carriage to be withdrawn and the marking device withdrawn from the line of vision.

Of course an instrument of the kind embodying my invention is also adapted for testing lenses having either plane, spherical, or cylindrical surfaces at either or both sides, as the reflected images from the opposite surfaces of the lenses when brought into coincidence in the manner hereinbefore described will accurately locate the optical axes of the lenses, and the peculiar arrangement of the lens-supporting pins insures a firm and proper seating of the plane and spherical surfaces of the lenses at all positions, and the cylindrical surface when the lens is in centered position and the yielding arrangement for the marking devices enables them to apply the ink to the surfaces of lenses having widely-differing curvatures that may be either concave or convex.

The instrument employed for performing the method described enables the optical axes of lenses of extremely small powers to be quickly and accurately located, even by an unskilled operator, avoiding the delicate operations heretofore practiced for this class of lenses, and which were subject to error, and it also enables all of the operations to be performed on lenses of different classes and powers without requiring any adjustment or focusing of the apparatus.

Of course it will be understood that the device I have shown is adapted for centering the lenses with reference to their optical axes and without regard to their outline, this particular form of device being used generally in connection with lenses which have not been cut into their desired outline, and when it is desired to center lenses with respect to their outline—such, for example, as to determine the optical axis of the cylinder of the usual elliptical eyeglass-lens with respect to its geometrical axis—any desired rotatable lens support or holder for positioning the elliptical lens may be employed, and by the use of the method hereinbefore described the optical axis may be readily determined.

I claim as my invention—

1. In a device for centering lenses, the combination with a support having an eyepiece and a lens-support thereon, of an object centered with respect to the line of vision between the eyepiece and lens-support and adapted to direct its rays upon a lens upon the lens-support.

2. In a device for centering lenses, the combination with a support having an eyepiece and a lens-support thereon, of an object located at the same point as the eyepiece for directing its rays upon the surfaces of a lens on the lens-support.

3. In a device for centering lenses, the combination with a support having an eyepiece and a lens-support thereon, of a mirror arranged between the eyepiece and lens-support having a clear spot thereon in line with the aperture of the eyepiece.

4. In a device for centering lenses, the combination with a support having an eyepiece and a lens-support thereon, of a pivoted mirror having an object thereon, and capable of tilting to enable rays from the object thereon to be directed on the surfaces of a lens on the lens-support.

5. In a device for centering lenses, the combination with a support having an eyepiece and a lens-support thereon, of a pivoted mirror having a clear spot thereon centered with respect to the line of vision between the eyepiece and lens-support, the mirror being adjustable to enable an image of the clear spot of the mirror to be readily observed from the eyepiece.

6. In an instrument for centering lenses, the combination with a support having an eyepiece and a lens-support thereon, of a mirror having a clear spot therein centered with respect to the line of vision between the eyepiece and the lens-support, and having cross-lines thereon intersecting at the clear spot.

7. In an instrument for centering lenses, the combination with a support having an eyepiece thereon, of a lens-support in alinement with the eyepiece for engaging the surface of a lens, embodying a series of pins capable of adjustment to bring their lens-engaging portions in a given plane.

8. In an instrument for centering lenses, the combination with a support having an eyepiece thereon, of a lens-support for engaging one of the surfaces of a lens embodying a series of pins capable of being adjusted to bring their lens-engaging portions in a plane arranged perpendicularly to the line of vision between the eyepiece and a central point of the lens-support.

9. In an instrument for centering lenses, the combination with a support having an eyepiece thereon, of a lens-support embodying a plate, and a series of spaced pins disposed in predetermined arrangement and adjustable transversely of the plate so as to bring the lens-engaging portions of the several pins into the same plane.

10. In an instrument for centering lenses, the combination with a base having a lens-support and an eyepiece thereon, of a marking device mounted to move into and out of the line of vision between the eyepiece and lens-support for marking a lens upon the lens-support, and means for moving the marking device into coincidence with the line of vision and for reciprocating said marking device directly in the line of vision relatively to a lens on the lens-support.

11. In an instrument for centering lenses, the combination with a base having a lens-support and eyepiece thereon, of a reciprocatory carriage, a swinging arm on the carriage having a marking device thereon, and means for swinging the marking device into and out of the line of vision between the eyepiece and lens-support automatically during the reciprocatory movements of the carriage.

12. In an instrument for centering lenses, the combination with a base having a lens-support and eyepiece thereon, of a reciprocatory carriage a swinging arm pivoted thereon having a marking device, in fixed relation thereon, a lever for operating said arm and a projection on the base cooperating with said lever during the reciprocatory movement of the carriage to move the marking device into the line of vision between the eyepiece and the lens-support for marking a lens on the latter, and an inking device for applying ink to the marking devices when the latter is moved out of operative position.

13. In an instrument for use in centering lenses, the combination with a base having a lens-support and eyepiece thereon, and a mirror mounted in alinement with the lens-support and eyepiece, and having an object thereon adapted to be reflected onto the surfaces of a lens on the lens-support, of a marking device arranged to move into and out of cooperative relation with a lens on the lens-support, and means for setting the marking device into operation at the proper moment to mark the lens under test.

14. In an instrument adapted for use in testing lenses, the combination with a base having a lens-support and eyepiece thereon, of a luminous object arranged in alinement with the lens-support and eyepiece and adapted to reflect rays therefrom onto a lens positioned on the lens-support.

15. In an instrument adapted for use in testing lenses, the combination with a suitable base having a lens-support thereon, and an eyepiece, of a marking device arranged to move into and out of cooperative relation with a lens on the lens-support, an operating-shaft, and a clutch for operatively connecting the latter and the marking device for setting the latter in operation.

16. In an instrument adapted for use in testing lenses, the combination with a suitable base having a lens-support thereon, and an eyepiece, of a carriage mounted to reciprocate on the base between the lens-support and eyepiece, a swinging arm on the carriage having a marking device arranged to cooperate with a lens on the lens-support, and devices coöperating with a part connected to said arm during the reciprocatory movement of said carriage for automatically moving the marker into and out of coöperative relation with a lens on said support.

17. In an instrument adapted for use in testing lenses, the combination with a suitable base, and a lens-support and eyepiece mounted thereon, of a reciprocatory carriage mounted to operate on the base in line with the lens-support and eyepiece, a swinging arm mounted on said carriage and having a marking device thereon arranged to move into and out of coöperative relation with a lens on said lens-support, an inking-roller on said carriage arranged to coöperate with said marker and means arranged between the base and carriage for rotating said roller by means of the reciprocatory movement of said carriage.

18. In an instrument adapted for use in testing lenses, the combination with a suitable base, an eyepiece, and a lens-support, of a carriage mounted to reciprocate on the base in line with the eyepiece and lens-support, a marking device mounted on the carriage and arranged to coöperate with a lens on the lens-support, and devices arranged between said marking device and base for operating the former at a predetermined point in the movement of the carriage.

ARTHUR PELLOW.

Witnesses:
 GEORGE H. LEFFLER,
 WILLIAM V. MOORE.